(12) United States Patent
Stavely et al.

(10) Patent No.: US 7,920,180 B2
(45) Date of Patent: Apr. 5, 2011

(54) IMAGING DEVICE WITH BURST ZOOM MODE

(75) Inventors: Donald J. Stavely, Windsor, CO (US); Andrew C. Goris, Loveland, CO (US); Linda A. Kennedy, Fort Collins, CO (US); Victoria L. Naffier, Fort Collins, CO (US); Robert F. Yockey, Holzgerlingen (DE); Lisa K. Roberts, Fort Collins, CO (US); James S. Voss, Fort Collins, CO (US); George W. Prokop, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1415 days.

(21) Appl. No.: 10/819,779

(22) Filed: Apr. 6, 2004

(65) Prior Publication Data

US 2005/0219386 A1    Oct. 6, 2005

(51) Int. Cl.
*H04N 5/262* (2006.01)
*H04N 5/225* (2006.01)

(52) U.S. Cl. ............... 348/240.2; 348/220.1; 348/240.1

(58) Field of Classification Search ............ 348/240.99, 348/240.1, 240.3, 345, 347, 349, 220.1; 396/85–87, 396/89
See application file for complete search history.

(56) References Cited

U.S. PATENT DOCUMENTS

| | | | | |
|---|---|---|---|---|
| 5,155,515 A * | 10/1992 | Kohmoto et al. | ............... | 396/76 |
| 5,172,234 A * | 12/1992 | Arita et al. | ................. | 348/240.2 |
| 5,276,563 A * | 1/1994 | Ogawa | .......................... | 386/120 |
| 6,239,838 B1 * | 5/2001 | Lee et al. | ................. | 348/240.99 |
| 6,487,370 B2 * | 11/2002 | Numako et al. | ................. | 396/83 |
| 6,750,903 B1 * | 6/2004 | Miyatake et al. | ........... | 348/218.1 |
| 6,757,013 B2 * | 6/2004 | Matsuzaka | ................. | 348/240.1 |
| 7,417,673 B2 * | 8/2008 | Wright et al. | ............... | 348/240.1 |
| 7,688,364 B2 * | 3/2010 | LeGall et al. | ............. | 348/240.99 |
| 7,707,491 B2 * | 4/2010 | Suzumura et al. | ............ | 715/234 |
| 2002/0118966 A1 * | 8/2002 | Hofer et al. | ....................... | 396/79 |
| 2003/0137597 A1 * | 7/2003 | Sakamoto et al. | ............ | 348/371 |
| 2005/0099514 A1 * | 5/2005 | Cozier et al. | ............. | 348/240.99 |
| 2005/0212955 A1 * | 9/2005 | Craig et al. | .................... | 348/362 |
| 2008/0049124 A1 * | 2/2008 | Tanizoe et al. | ........... | 348/240.99 |

* cited by examiner

*Primary Examiner* — David L Ometz
*Assistant Examiner* — Carramah J Quiett

(57) ABSTRACT

A method of capturing images in an imaging device in a burst zoom operation includes zooming the imaging device from a first zoom setting to a second zoom setting, and automatically capturing a plurality of still images during the zooming, each of the plurality of still images being captured at a different zoom setting.

12 Claims, 4 Drawing Sheets

IMAGING DEVICE WITH BURST ZOOM MODE

BACKGROUND

As still imaging devices such as film cameras and digital cameras become more sophisticated, they are incorporating features and modes that make the picture-taking process both more fun and more foolproof. For example, burst modes are available that capture a series of images in rapid succession. Images captured in burst mode can be used to generate slide shows and animations on a computer or television. The same capability can be used to ensure that the photographer captures the perfect single shot of a moving subject, such as a racer crossing the finish line or a bride throwing the bouquet.

A burst mode is a powerful tool for capturing the time-sequence of the subject, as described above. However, the burst mode and other currently available modes do not help the photographer in correctly framing the image, that is, in selecting the best composition for the image, for example to call attention to the subject and add dimension to the image. Photographers often select a zoom setting that frames their subject unimaginatively or even inappropriately.

SUMMARY

An exemplary embodiment may comprise a method of capturing images in an imaging device in a burst zoom operation, including zooming the imaging device from a first zoom setting to a second zoom setting, and automatically capturing a plurality of still images during the zooming, each of the plurality of still images being captured at a different zoom setting.

Another exemplary embodiment may comprise an apparatus for capturing images in a burst zoom mode in an imaging device, the apparatus including at least one computer readable medium having computer readable program code stored thereon. The computer readable program code includes program code for zooming the imaging device and program code for automatically capturing a plurality of still images during the zooming.

Another exemplary embodiment may comprise an imaging apparatus having a zoom lens system, a zoom motor connected to the zoom lens system for automatically zooming the zoom lens system, and a control system connected to the zoom motor. The control system is adapted to capture a plurality of still images in a burst zoom mode, each of the plurality of images being captured at a different zoom setting while the zoom motor is automatically zooming the zoom lens system.

Another exemplary embodiment may comprise an imaging apparatus. The apparatus includes means for zooming the imaging apparatus, and means for capturing a plurality of still images during the zooming, wherein each of the plurality of still images are captured at a different zoom setting.

BRIEF DESCRIPTION OF THE DRAWINGS

Illustrative embodiments are shown in the accompanying drawings, in which.

DESCRIPTION

Figure 1:
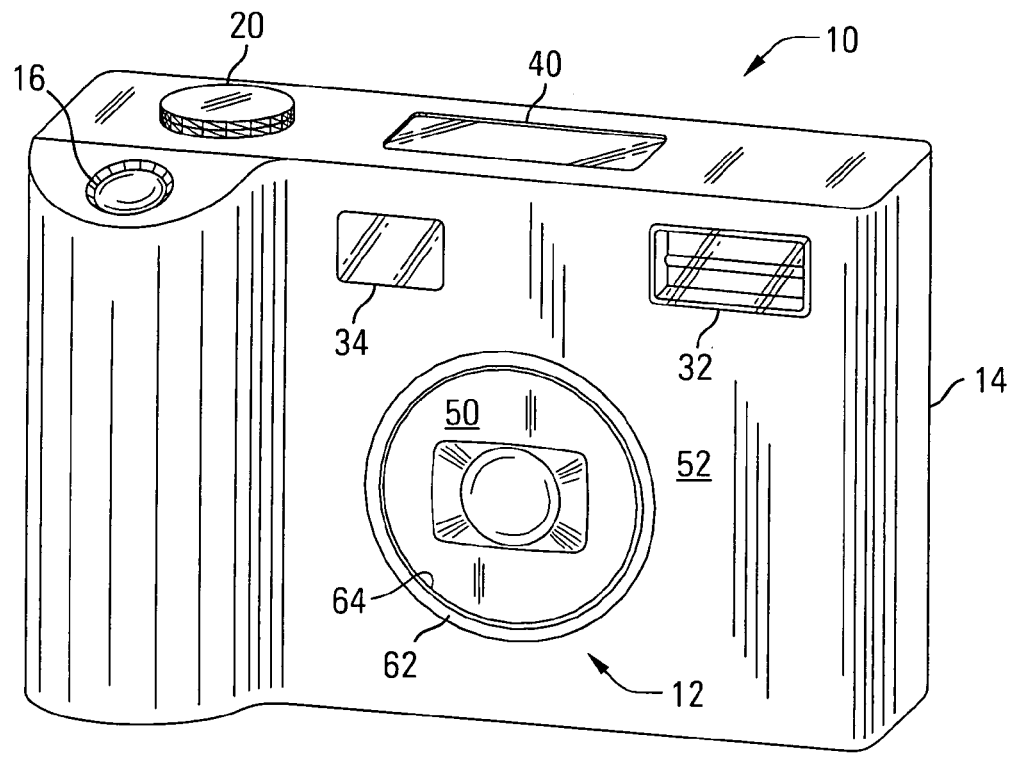
FIG. 1 is an isometric front view illustration of an exemplary imaging device with a zoom lens, with the zoom lens retracted.

The drawing and description, in general, disclose an imaging device with a burst zoom mode for automatically capturing a series of still images at different zoom settings. The series of still images is captured by the imaging device while the zoom lens assembly is moving through a range of focal lengths or zoom settings. In one exemplary embodiment, the imaging device captures the series of images at the burst rate of the imaging device. Each of the series of still images is captured at a different zoom setting during the burst zoom operation. The range of focal lengths through which the imaging device moves and at which the series of still images is captured may vary from the entire focal length range of the imaging device to only a small portion of the focal length range. The imaging device maintains focus during the burst zoom operation so that each of the series of still images are in focus.

The series of still images may be reviewed later to find the image with the best zoom setting for the subject. For example, the photographer may be surprised to discover that the shot from the series with the maximum close-up of a baby's face might be far more interesting than a more conventional "head and shoulders" or full body shot. The burst zoom mode thus aids the photographer in framing a subject.

A burst-zoom series may also be used in a group for viewing as an animation or slide sequence on a computer or television, or the group may be printed as an image series or collage. For example, a series could begin with a wide-angle view of a mountain and continue with progressively magnified images to show climbers on a rock face. In either the soft- or hard-copy form, such a presentation is far more interesting than a single image from only one perspective.

The burst zoom mode may be implemented in any imaging device that captures still images, such as a film camera or a digital camera. An exemplary digital camera with burst zoom mode will be described herein, however, it is important to note that the burst zoom mode is not limited to use with any particular type of imaging device as long as it captures still images.

As described above, a series of still images is captured by the imaging device in burst zoom mode, each taken at a different zoom setting or focal length. The zoom setting or focal length may be adjusted in any suitable manner, including by optically zooming a zoom lens assembly, or digitally zooming the imaging device by using data from only a portion of an electronic photodetector in the imaging device. A traditional definition of the term focal length is the distance from the focal point to the lens, although similar definitions exist with some differences which are equally applicable herein, as long as they vary the magnification of objects in the field of view. In particular, because the burst zoom mode may employ a digital zoom in one exemplary embodiment as discussed above, the digital zoom in that embodiment does not alter the "focal length" according to the traditional definition. However, the term "focal length" is used interchangeably with the term "zoom setting" herein and refers to the magnification of the field of view of the imaging device.

Figure 2:
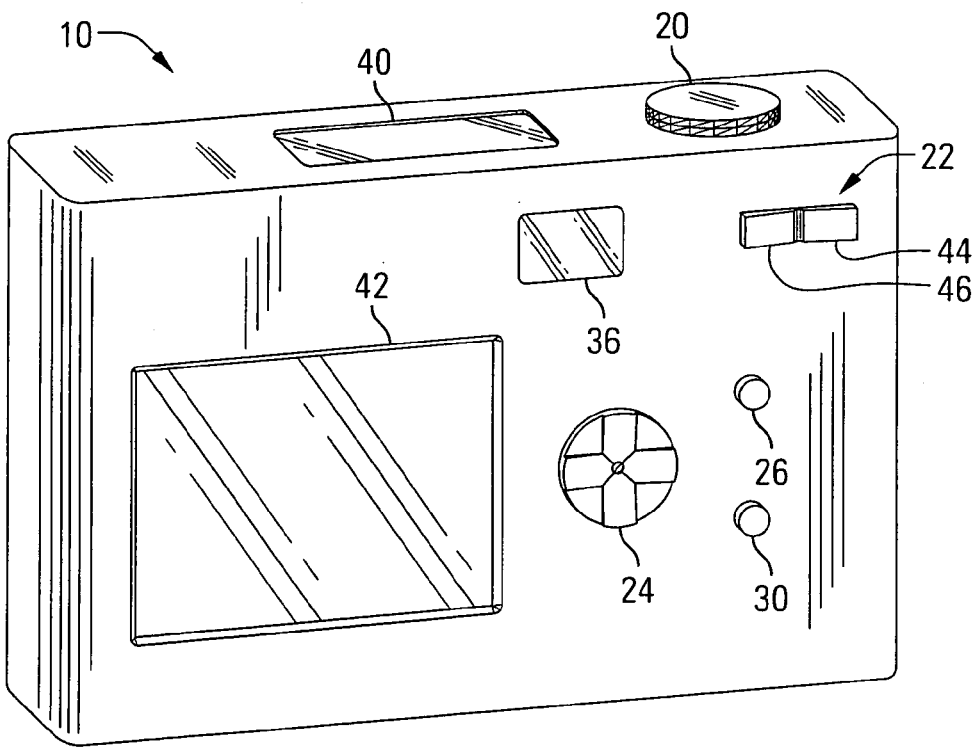
FIG. 2 is an isometric rear view illustration of the exemplary imaging device of FIG. 1.
Figure 6:
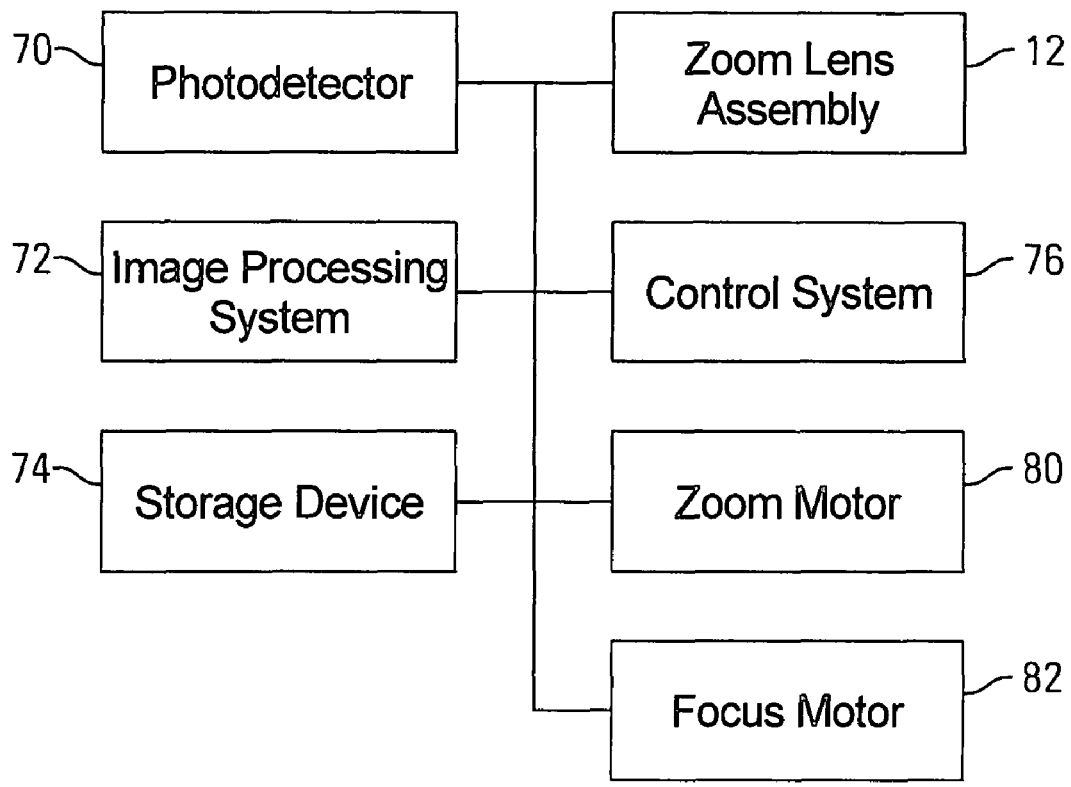
FIG. 6 is a block diagram of an exemplary embodiment of an electronic imaging device.

Before continuing to describe the burst zoom mode in more detail, an exemplary digital camera which may include a burst zoom mode will be described. Referring simultaneously to FIGS. 1 and 2 and the block diagram of FIG. 6, an exemplary digital camera 10 which includes a burst zoom mode will be described. The digital camera 10 comprises a housing portion or body 14 which is sized to receive the various systems and components required by the digital camera 10. For example, in the embodiment shown and described herein, the body 14 is sized to receive a zoom lens assembly 12, a photodetector 70, a storage device 74 to store the image data collected by the photodetector 70, and an image processing system 72 to process and format the image data. The zoom lens assembly 12 is located in the body 14 to allow light to enter the digital camera 10. (As noted above, the burst zoom mode could alternatively be applied to an imaging device without a zoom lens. In this exemplary embodiment, the digital camera 10 supports both optical and digital zooming, and therefore includes a zoom lens assembly 12.) A zoom motor 80 and focus motor 82 are connected to the zoom lens assembly 12 to automatically zoom and focus the digital camera 10 and are controlled by a control system 76. The body 14 may also be sized to receive a power source such as a-battery. Control buttons such as a shutter control button 16, a mode dial 20, a zoom control switch 22, and others (e.g., 24, 26, and 30) as needed are provided on the outside of the body 14. The digital camera 10 preferably includes an illumination system such as a flash 32 mounted on the outside of the body 14. Viewfinder windows 34 and 36 and display devices 40 and 42 are also located on the outside of the body 14. Each of the foregoing systems and devices will now be described.

Image light enters the digital camera 10 through the zoom lens assembly 12. The photodetector 70 detects the image light focused thereon by the zoom lens assembly 12 and comprises a charge-coupled device (CCD), although other devices may be used. A typical CCD comprises an array of individual cells or pixels, each of which collects or builds-up an electrical charge in response to exposure to light. Because the quantity of the accumulated electrical charge in any given cell or pixel is related to the intensity and duration of the light exposure, a CCD may be used to detect light and dark spots in an image focused thereon.

The term image light as used herein refers to the light, visible or otherwise, that is focused onto the surface of the photodetector 70 by the zoom lens assembly 12. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter, generating numeric representations of the amplitudes of the analog voltages. The digital data then may be processed and/or stored as desired.

A storage device 74 is located in the body 14 of the digital camera 10 to store the image data collected by the photodetector 70. The storage device 74 comprises a removable rewriteable non-volatile memory, or may comprise a random access memory (RAM), or a magnetic, optical, or other solid state storage medium. An image processing system 72 is located in the body 14 of the digital camera 10 to process and format the image data, either before or after storage in the storage device 74. The image processing system 72 comprises a microprocessor and associated memory. Alternatively, the image processing system 72 may comprise a hard-coded device such as an application specific integrated circuit (ASIC). The image processing system 72 processes image data to scale images for display on a graphical display device 42, among other tasks.

The graphical display device 42 comprises a liquid crystal display (LCD) or any other suitable display device. An alpha-numeric display device 40 on the digital camera 10 also comprises an LCD or any other suitable display device, and is used to indicate status information, such as the number of images which can be captured and stored in the storage device, and the current mode of the digital camera 10.

The digital camera 10 may also include other components, such as an audio system. However, because digital cameras are well-known in the art and could be provided by persons having ordinary skill in the art after having become familiar with the teachings of the present disclosure, the digital camera 10 utilized in one embodiment, as well as the various ancillary systems and devices (e.g., battery systems and storage devices) that may be utilized in one embodiment will not be described in further detail herein.

During operation of the digital camera 10, the digital camera 10 is turned on and off by one of the control buttons such as the mode dial 20, and a mode is selected, such as a single shot mode, burst mode, or burst zoom mode. The digital camera 10 is oriented with the zoom lens assembly 12 directed at a subject. The subject may be monitored either through a viewfinder 34 and 36, or on the graphical display panel 42. The zoom setting of the digital camera 10 is adjusted by pressing a control button such as the zoom control switch 22. For example, when one side 44 of the zoom control switch 22 is pressed, the digital camera 10 zooms in on the subject. When the other side 46 of the zoom control switch 22 is pressed, the digital camera 10 zooms out from the subject. As discussed above, the exemplary digital camera 10 includes both optical zoom and digital zoom. Therefore, when the zoom control switch 22 is pressed, the focal length of the zoom lens assembly 12 is first adjusted until it reaches its limit, then the digital camera 10 will continue to digitally zoom, thereby effectively continuing to adjust the focal length or zoom setting until the limit of the digital zoom is reached.

A focus region in the viewfinder 34 and 36 is directed at a focus object, an object in the field of view which is to be brought into focus, and focus lens elements in the zoom lens assembly 12 are adjusted to focus image light from the focus object onto the photodetector 70. When the digital camera 10 is properly oriented, zoomed and focused, the shutter control button 16 is pressed. The flash 32 illuminates the subject, if needed. The photodetector 70 then converts the image light directed thereon by the zoom lens assembly 12 into electrical image data, which are stored in the storage device 74. The image processing system 72 then processes the image data and displays the captured image on the display device 42.

Figure 3:
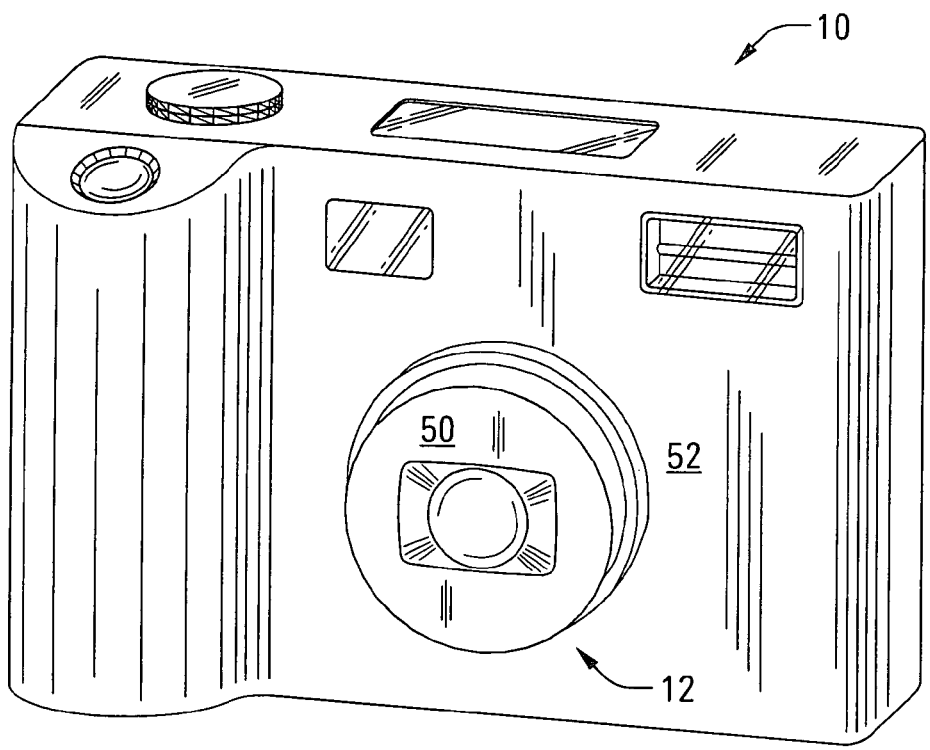
FIG. 3 is an isometric front view illustration of the exemplary imaging device of FIG. 1 with the zoom lens extended to the wide angle position.
Figure 4:
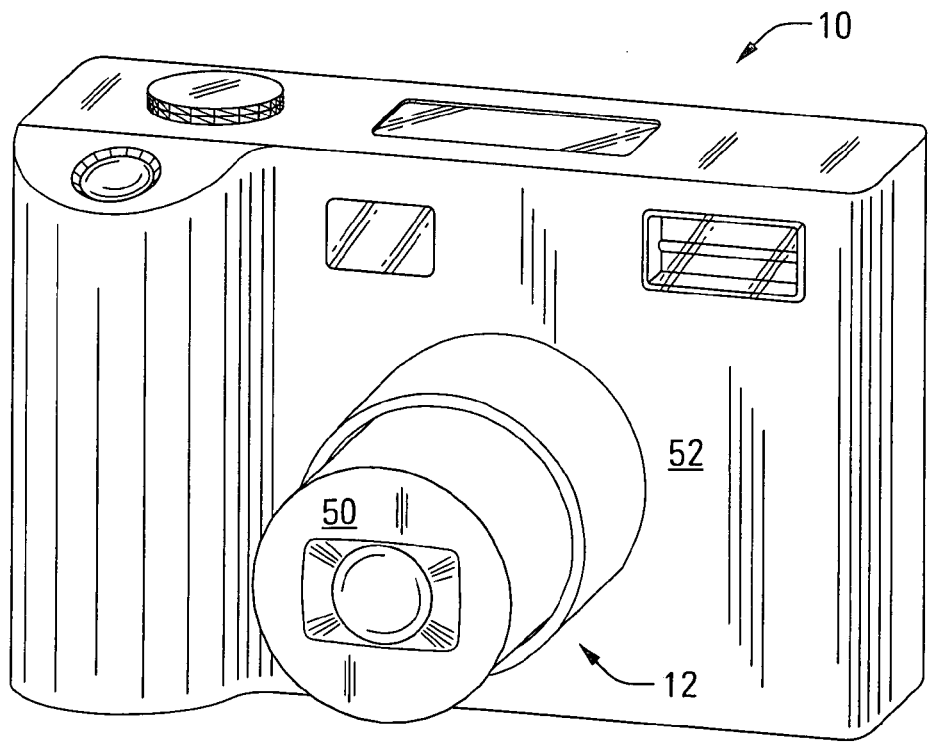
FIG. 4 is an isometric front view illustration of the exemplary imaging device of FIG. 1 with the zoom lens extended to the telephoto position.
Figure 5A:
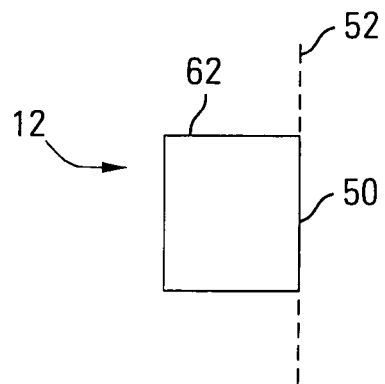
FIG. 5a is a side illustration of an exemplary zoom lens assembly in the retracted position.
Figure 5B:
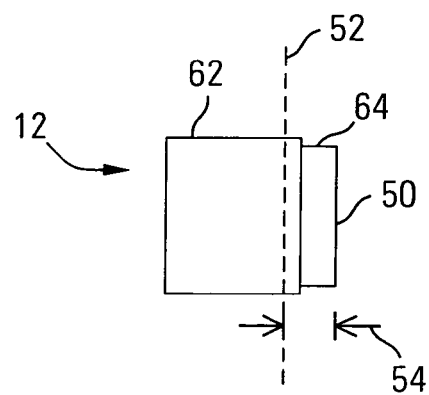
FIG. 5b is a side illustration of an exemplary zoom lens assembly extended to the wide angle position.
Figure 5C:
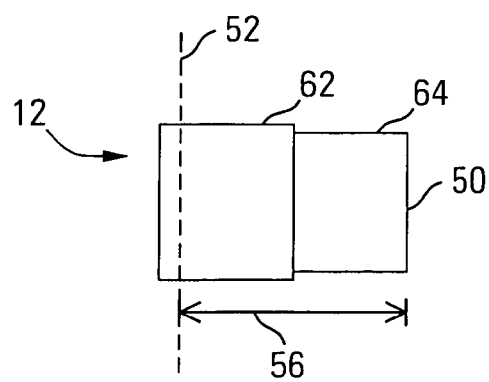
FIG. 5c is a side illustration of an exemplary zoom lens assembly extended to the telephoto position.

The zoom lens assembly 12 in an exemplary embodiment is retractable, that is, the zoom lens assembly 12 can be retracted into the body 14 of the digital camera 10 so that the front 50 of the zoom lens assembly 12 is substantially flush with the front 52 of the digital camera 10, as illustrated in FIGS. 1 and 5a. The zoom lens assembly 12 is retracted when the digital camera 10 is turned off to minimize the size of the digital camera 10 and to prevent damage to the zoom lens assembly 12. When the digital camera 10 is turned on and the zoom lens assembly 12 is zoomed to its longest focal length, the zoom lens assembly 12 extends a small distance 54 from the front 52 of the digital camera 10, as illustrated in FIGS. 3 and 5b. When the zoom lens assembly 12 is zoomed to its shortest focal length, capturing the widest angle possible, the zoom lens assembly 12 extends a larger distance 56 from the front 52 of the digital camera 10, as illustrated in FIGS. 4 and 5c. In an alternative zoom lens assembly, the lens extends farther when zoomed to its telephoto position than when zoomed to its widest angle setting.

Again, the imaging device with burst zoom mode is not limited to use with any particular type of imaging device, nor with any particular type of zoom system. For example, it may be applied to digital or film still cameras, to various zoom lens systems or digital zoom algorithms, etc.

Figure 7:
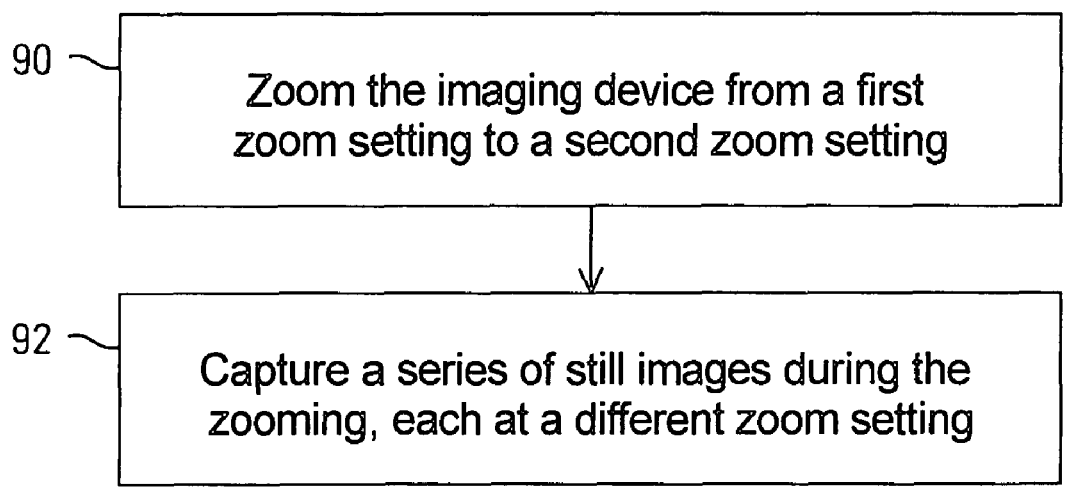
FIG. 7 is a flow chart of an exemplary burst zoom mode operation for automatically capturing a series of images at different zoom settings.

An exemplary embodiment of the burst zoom operation is summarized in the flow chart of FIG. 7. The imaging device is zoomed 90 from a first zoom setting to a second zoom setting, and a series of still images is captured 92 during the zooming, each at a different zoom setting. As will be discussed below, the imaging device should maintain a focused condition during the zooming operation so that each image in the series is in focus.

A variety of alternative embodiments are available for the burst zoom mode. For example, the burst zoom operation may either zoom in or out, the zooming operation may zoom between the available focal length extremes, whether optically, digitally, or both. Alternatively, the burst zoom operation may zoom over only a portion of the available focal length range. The burst zoom operation may begin at a zoom position selected by the photographer and zoom from that beginning zoom position in one direction. Alternatively, the burst zoom operation may "back up" from the beginning zoom position before starting the zooming and capturing of images. For example, if the burst zoom operation is configured to zoom in while capturing images, the imaging device may first zoom out briefly from the beginning zoom position before zooming in while capturing images, thereby expanding the range of zoom settings at which the images are captured.

Several of these alternative embodiments will now be described with respect to the exemplary digital camera 10. In the first exemplary embodiment, the digital camera 10 zooms in from one extreme of the available focal length range to the other while capturing a series of still images in burst zoom mode. To begin the burst zoom operation, the photographer adjusts the mode dial 20 to select the burst zoom mode. The photographer aims the digital camera 10, and presses the shutter control button 16. Because the control system 76 in the digital camera 10 is configured to zoom in from one extreme focal length to the other, the control system 76 first adjusts the zoom motor 80 to fully zoom out, if necessary, before beginning the burst zoom operation. The control system 76 then adjusts the zoom motor 80 to zoom in all the way to the extreme zoomed-in focal length, capturing still images along the way at the burst rate of the digital camera 10. The control system 76 may then continue to digitally zoom until the maximum digital zoom setting is reached, continuing to capture still images as the digital camera 10 digitally zooms.

In an alternative embodiment, the control system 76 may capture images during zooming at a slower pace than the burst rate of the digital camera 10. If the digital camera 10 has a very wide available range of zoom settings, a relatively slow zoom operation, and a relatively fast burst rate, the control system 76 may be configured to capture images more slowly to limit the number of still images in a series, for example to three or five images.

If the particular zoom lens assembly 12 in the imaging device has a discrete number of acceptable zoom settings, the control system 76 may be configured to capture images only at these zoom settings during the burst zoom operation, and not when zooming between these settings, to ensure that each is focused properly.

Note that as discussed above, the digital camera 10 must maintain focus during the burst zoom operation. This may be done in a variety of ways, depending upon the equipment in the digital camera 10. For example, some higher-end zoom lens assemblies are designed so that focus is maintained during zoom changes using precise gearing or other mechanical systems. Other zoom lens assemblies must be adjusted during the burst zoom operation to maintain focus, either by performing an autofocus operation while zooming or by applying an algorithm to calculate focus adjustments based on zoom settings. An example of the latter technique is disclosed in U.S. patent application Ser. No. 20020118966 of Gregory V. Hofer et al. for a "Zoom and focus control system in an optical system", filed Aug. 29, 2002, which is hereby explicitly incorporated herein for all that it discloses.

The control system 76 may also need to prevent motion blur by pausing or slowing the zooming during the burst zoom operation when images are being captured. For example, a digital camera 10 with a relatively slow photodetector 70 and a relatively fast zoom motor 80 may need to pause the zooming to capture each image without motion blur. In contrast, a film camera with a fast film speed and a moderate zoom motor 80 may be able to capture each image without pausing the zooming, without incurring motion blur in the images. Note that the control system 76 may require information from the imaging device 10 to make this decision on whether to pause, such as film speed, ambient light levels, aperture setting, etc. Other information may be hardcoded in the control system 76, such as zoom speed, photodetector sensitivity, etc.

In a second exemplary embodiment, the digital camera 10 zooms out from one extreme of the available focal length range to the other while capturing a series of still images in burst zoom mode. This embodiment may be advantageous over the first in which the burst zoom mode zoomed in. In this embodiment, the photographer may begin with the digital camera 10 in a relatively zoomed-in state, thereby facilitating the aiming of the digital camera 10 at the subject (e.g., the climbers on the rock wall discussed above). To begin the burst zoom operation, the photographer adjusts the mode dial 20 to select the burst zoom mode. The photographer may zoom in by pressing the zoom control switch 22 and then aims the digital camera 10 and presses the shutter control button 16. Because the control system 76 in the digital camera 10 is configured to zoom out from one extreme focal length to the other, the control system 76 first adjusts the zoom motor 80 to fully zoom in before beginning the burst zoom operation, if the photographer has not already fully zoomed-in. (The burst zoom operation may also start at the fully digitally zoomed-in position as well, or simply at the zoom setting selected by the photographer.) The control system 76 then adjusts the zoom motor 80 to zoom out all the way to the extreme zoomed-out focal length, capturing still images along the way at the burst rate of the digital camera 10.

In a third exemplary embodiment, the digital camera 10 zooms over only a portion of the full zoom range during the burst zoom operation. In this embodiment, the control system 76 is configured to zoom out while capturing still images, beginning near, but not necessarily at, the zoom setting selected by the photographer at the beginning of the burst zoom operation. To begin the burst zoom operation, the photographer adjusts the mode dial 20 to select the burst zoom mode. The photographer zooms in on the subject by pressing the zoom control switch 22, aims the digital camera 10, and presses the shutter control button 16. The control system 76 in the digital camera 10 adjusts the zoom motor 80 to zoom in by a predetermined amount if possible before beginning the capture process so that at least one still image is captured while zoomed-in beyond the photographer's selected zoom setting. This causes the photographer's selected zoom setting to be bracketed by other zoom positions in the series of images. The control system 76 then begins the capture portion of the burst zoom operation by zooming back out while capturing still images at the burst rate of the digital camera 10. The control system 76 is configured to capture still images at zoom settings on either side of that selected by the photographer, although the photographer's selected zoom setting is not necessarily at the middle of the zoom range of the burst zoom operation.

The burst zoom operation may be triggered in any suitable manner, such as that described above, in which the mode selection is made using the mode dial 20, with the shutter control button 22 being pressed thereafter to begin the burst zoom operation. In an alternative embodiment, the burst zoom operation may be triggered by pressing the shutter control button 22 while holding the zoom control switch 22 down, with the direction of the burst zoom operation being determined by the state of the zoom control switch 22.

The burst zoom mode apparatus may be embodied in one exemplary embodiment as computer readable program code stored on at least one computer readable medium which may be executed in an imaging device, such as by a processor in the control system 76. The computer readable program code may comprise program code for zooming the imaging device, and program code for automatically capturing a plurality of still images during the zooming. The computer readable program code may further comprise program code for automatically focusing the imaging device during the zooming so that each of the plurality of still images are in focus.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method of capturing images in an imaging device in a burst zoom operation, comprising:
    bracketing a first zoom position selected by a user by automatically zooming in a first direction from said first zoom position to a second zoom position immediately after said first zoom position is selected by said user;
    immediately after said zooming in said first direction, automatically zooming said imaging device in a second direction past said first zoom position to a third zoom position, wherein a range of zoom positions is defined as being from said second zoom position to said third zoom position, wherein said first zoom position is bracketed within said range; and
    automatically capturing a plurality of still images during said zooming in said second direction, each of said plurality of still images being captured at a different zoom setting within said range, wherein said different zoom setting is controlled by a zoom lens control assembly in said imaging device based on a sensitivity of an electronic photodetector in said imaging device.

2. The method of claim 1, wherein said automatically capturing said plurality of still images comprises capturing said plurality of still images in a burst zoom mode.

3. The method of claim 1, further comprising keeping said imaging device focused during said zooming.

4. The method of claim 3, wherein said imaging device is kept focused during said zooming by said zoom lens control assembly in said imaging device mechanically maintaining a focus condition when the zoom setting is adjusted.

5. The method of claim 3, wherein said imaging device is kept focused during said zooming by automatically focusing during said zooming.

6. The method of claim 1, wherein said zooming comprises optically zooming said zoom lens control assembly in said imaging device by adjusting a focal length of said lens assembly.

7. The method of claim 1, wherein said zooming comprises digitally zooming said imaging device by digitally magnifying a portion of a detected image.

8. The method of claim 1, further comprising pausing said zooming while capturing each of said plurality of still images.

9. An apparatus for capturing images in a burst zoom mode in an imaging device, comprising:
   a. at least one computer readable medium; and
   b. computer readable program code stored on said at least one computer readable medium, said computer readable program code comprising:
      i. program code for a user selectable bracketing burst zoom mode wherein said user can select a first zoom position;
      ii. program code for automatically zooming said imaging device in a first direction from a first zoom position to a second zoom position in said user selectable bracketing burst zoom mode immediately after said user selects said first zoom position;
      iii. program code for, immediately after said zooming said imaging device in said first direction, automatically zooming said imaging device in a second direction past said first zoom position to a third zoom position in said user selectable bracketing burst zoom mode, wherein a range of zoom positions is defined as being from said second zoom position to said third zoom position, and wherein said first zoom position is bracketed within said range; and
      iv. program code for automatically capturing a plurality of still images during said zooming in said second direction, each of said plurality of still images being captured at a different zoom setting within said range, wherein said different zoom setting is controlled by a zoom control assembly based on a sensitivity of a electronic photodetector in said imaging device.

10. The apparatus of claim 9, further comprising program code for automatically focusing said imaging device during said zooming so that each of said plurality of still images is in focus.

11. The apparatus of claim 9, wherein said program code for zooming said imaging device comprises code for adjusting a focal length of a zoom lens in said zoom control assembly in said imaging device.

12. The apparatus of claim 9, wherein said program code for zooming said imaging device comprises code for digitally magnifying an output from a portion of said electronic photodetector in said imaging device.

* * * * *